United States Patent
Sato et al.

(10) Patent No.: US 7,420,527 B2
(45) Date of Patent: Sep. 2, 2008

(54) IMAGE DISPLAYING SYSTEM, IMAGE DISPLAYING DEVICE, IMAGE DATA OUTPUTTING DEVICE, IMAGE DISPLAYING METHOD, IMAGE DISPLAYING PROGRAM, AND IMAGE DATA OUTPUTTING PROGRAM

(75) Inventors: Minoru Sato, Sapporo (JP); Shinji Kubota, Ina (JP); Tomohiro Nomizo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 690 days.

(21) Appl. No.: 10/682,547

(22) Filed: Oct. 10, 2003

(65) Prior Publication Data

US 2004/0130502 A1 Jul. 8, 2004

(30) Foreign Application Priority Data

Oct. 15, 2002 (JP) ............................. 2002-300290

(51) Int. Cl.
*G09G 5/00* (2006.01)
*G06F 15/16* (2006.01)

(52) U.S. Cl. .................... 345/2.1; 345/1.2; 709/232

(58) Field of Classification Search ........... 345/1.1–1.3, 345/2.1–2.3, 3.1–3.4; 709/207, 217, 214, 709/204, 229, 232; 725/64, 120; 710/22
See application file for complete search history.

(56) References Cited

U.S. PATENT DOCUMENTS

| | | | |
|---|---|---|---|
| 5,812,859 A * | 9/1998 | Kamimaki et al. .......... 713/300 |
| 5,835,721 A * | 11/1998 | Donahue et al. ............ 709/224 |
| 6,343,313 B1 * | 1/2002 | Salesky et al. .............. 709/204 |
| 6,989,801 B2 * | 1/2006 | Bruning ..................... 345/2.1 |
| 7,035,774 B2 * | 4/2006 | Fujiwara et al. ............. 702/188 |
| 2002/0078172 A1 | 6/2002 | Yoshikai et al. |
| 2006/0168141 A1 | 7/2006 | Yoshikai et al. |

FOREIGN PATENT DOCUMENTS

| | | |
|---|---|---|
| CN | 1343935 A | 4/2002 |
| JP | A-4-256243 | 9/1992 |
| JP | A-8-65299 | 3/1996 |
| JP | A-9-16367 | 1/1997 |
| JP | A-9-330064 | 12/1997 |
| JP | A-2001-358919 | 12/2001 |
| JP | A-2002-108730 | 4/2002 |
| JP | A-2002-189586 | 7/2002 |

* cited by examiner

*Primary Examiner*—Kevin M. Nguyen
(74) *Attorney, Agent, or Firm*—Oliff & Berridge, PLC

(57) ABSTRACT

A system consisting of a plurality of terminals storing image data and an image displaying device which are connected with each other through a network capable of two-way communication has the disadvantage of decreasing in throughput on account of slow image data transfer over the network. The image displaying device performs two-way communications with each of the terminals by a communication means at the display device side. Also, the image displaying device acquires image data from a relevant terminal while instructing other terminals to suspend transmission by the image data acquisition controlling means, thereby suspending transmission of image data. The image displaying device displays images by the image displaying means based on the thus acquired image data.

4 Claims, 5 Drawing Sheets

IMAGE DISPLAYING SYSTEM, IMAGE DISPLAYING DEVICE, IMAGE DATA OUTPUTTING DEVICE, IMAGE DISPLAYING METHOD, IMAGE DISPLAYING PROGRAM, AND IMAGE DATA OUTPUTTING PROGRAM

BACKGROUND OF THE INVENTION

1. Field of the Invention

The present invention relates to an image displaying system, image displaying device, image data outputting device, image displaying method, image displaying program, and image data outputting program.

2. Description of the Prior Art

The image displaying system of conventional type consists of an image displaying device and a plurality of terminals connected thereto through a network so that the former displays images in response to image data transmitted from the latter. (See Japanese Patent Laid-open No. 2001-358919, for example.) In such a system, transmission of image data from the image data sources to the image displaying device is efficiently accomplished by giving an identifier to each image data source and allocating the storage areas in the image displaying device in correspondence with the identifier. Thus, the image data transmitted from each image data source is stored in each of the allocated areas This arrangement permits one image data source to transmit image data to the image displaying device while the image displaying device is performing presentation by using the image data transmitted from another image data source. The consequence is efficient transmission of image data from a plurality of image data sources and smooth switching of image data for presentation. (See Japanese Patent Laid-open No. 2001-358919, paragraph 48.)

The conventional image displaying system mentioned above has the disadvantage of being low in throughput on account of the network. In other words, the network is limited in the maximum transmission rate, and this poses a problem with transmission. That is if a plurality of terminals happen to transmit image data simultaneously, one of them may fail in adequate transmission or have to repeat transmission on account of congestion.

SUMMARY OF THE INVENTION

The present invention was completed in view of the foregoing. It is an object of the present invention to provide an image displaying system, image displaying device, image data outputting device, image displaying method, image displaying program, and image data outputting program, which are designed for smooth transmission of image data from a plurality of terminals.

According to the present invention, the above-mentioned object is achieved by connecting an image displaying device with a plurality of terminals through a network capable of two-way communications such that while a specific terminal is transmitting image data, other terminals do not transmit image data. To this end, the image displaying device possesses a means to control the acquisition of image data so as to cause image data sources, except for one specific image data source, to suspend transmission. Each terminal possesses a means to control the output of image data so that it does not output image data upon its receipt of an instruction to suspend transmission. Thus, the means to control the output of image data outputs image data unless it receives an instruction to suspend transmission. In other words, the terminal that outputs image data is the specific terminal and the means to control the acquisition of image data acquires image data from the specific terminal.

Thus, at the time of transmission of image data from a plurality of terminals, the foregoing arrangement makes it possible to restrict the terminal that actually outputs data to the network and the amount of data to be output to the network. Needless to say, in the case where a plurality of terminals are the source of transmission of image data after a specific terminal has finished transmission of image data, another terminal is made a specific terminal. This arrangement permits all the sources of transmission to transmit image data to the image displaying device while restricting the amount of data to be output to the network.

Here, any one of the terminals to output image data for display of image by the image displaying device should become the specific terminal at least once. The amount of data to be sent to the network may be restricted if there exists only one terminal at all times in the simplest embodiment of the present invention. However, for a network with a high transmission rate, it is acceptable that two or more terminals are made the specific terminals and they are allowed to output image data simultaneously, while other terminals than the specific terminals are suspending transmission of image data. Instruction to suspend transmission may vary in its form so long as it is addressed to specific terminals. For example, in the case of packet communications, it may describe the data to specify the recipient terminal at the header of the data packet and the command to suspend transmission (which is understandable by each terminal) as the content of transmission data.

Incidentally, according to the present invention, the image displaying device has a communication means at the displaying device side and each of the terminals has a communication means at the terminal side, so that these communication means perform two-way communications. So long as these communication means permit two-way communications between the image displaying device and the terminals, they are not specifically restricted in communication line, protocol, standard, etc. For example, the communication line may be wire network or wireless network, the protocol may be TCP or UDP, and the standard may be Ethernet (registered trademark of Fuji-Xerox Corp.). IEEE1394, USB, or the like.

The image displaying device may widely vary in its type: it is not specifically restricted in its way to display images. It may be a projector (designed to project images to a screen), a plasma display (designed to display images on its built-in screen), a CRT, or a liquid crystal display. Presentation is one way to display images from a plurality of terminals. Any displaying device capable of displaying a large image is desirable for presentation. The terminal should be able to store image data and output it later as required; it may be a general-purpose computer or a recording-reproducing device (such as video).

The present invention is directed to an image displaying system consisting of an image displaying device and a plurality of terminals. The present invention is directed separately to the image displaying device and each of the terminals. The image displaying device to display images upon acquisition of image data from a plurality of terminal should desirably be able to switch its operating mode. In one mode, it displays on one screen images supplied from a plurality of terminals. In another mode, it displays on one screen a single image supplied from each terminal separately.

Thus, the image displaying device should be provided with a mode switching means so that it can switch the split display mode and the sequential display mode from each other according to the user's preference. The mode switching means may be widely varied. It may be a mode switching button attached to the image displaying device proper. Or it may be a switch capable of remote control. Another possible arrangement is such that a plurality of terminals issue instruction for mode switching. In this case, each terminal sends a mode switching command through the above-mentioned network and the image displaying device switches mode as it receives the command.

The split displaying mode permits each of the divided sections of the screen to display the image based on the individual image data which has been output from a plurality of terminals. This arrangement realizes presentation with a plurality of images. The way of splitting the screen is not specifically restricted; the screen may be equally divided into identical panes or unequally divided into a large and small panes. The number of splitting is not specifically restricted. Presentation with a plurality of images does not usually use all the images at one time but switches the images sequentially in each split section.

According to the present invention, acquisition of images from a plurality of terminals is accomplished in such a way that the image displaying device acquires image data from a specific terminal and then (after it has acquired image data) it acquires image data from another terminal. Therefore, if images in split sections are switched one by one, it is possible to prohibit transmission from terminals other then that which outputs image data for the image which has been switched. This permits the image displaying device to acquire necessary data rapidly. In this way it is possible to prevent the transmission of image data for the image which is not switched. In other words, there is no possibility that unnecessary data is transmitted over the network.

The sequential display mode is one which displays on a single screen the image based on image data which has been output from a plurality of terminals and which switches the image as required. This arrangement realizes presentation with images which have been output from a plurality of terminals. In this case, too, the image displaying device only acquires the image data for images being displayed and hence the image data for images not being displayed is not transmitted over the network. Therefore, there is no possibility that unnecessary data is transmitted over the network. This reduces the network load and permits speedy acquisition of necessary data. Incidentally, in either mode, the switching of images may be accomplished by means of a button (on the image displaying device) or a remote controller.

A desirable split display mode may be constructed such that the image displaying device sequentially acquires image data for the images to be displayed on the split sections. In this case, the terminals (or the abovementioned specific terminals) which output image data are sequentially switched without suspending the output of image data. In other words, as one terminal completes the output of image data, the image displaying device instructs that terminal to suspend transmission and instructs other terminals not to perform transmission. It is also possible to instruct a now specific terminal to start transmission instead of instructing to suspend transmission. In this way it is possible to limit the number of terminals which send data over the network and to permit the image displaying device to acquire image data for each image to be displayed on the split section while keeping the network load low.

The sequential display mode may be carried out in such a way that the image displaying device continues to acquire image data until the specific terminal transmitting image data is switched. As the result, the specific terminal transmits over the network only the image data to be displayed on the image displaying device. Needless to say, other terminals, which are not instructed to suspend transmission, continue to output image data. Continuance of the acquisition or output of image data for still pictures means that the terminal transmits image data for one picture and then waits and transmits again image data for the next picture as soon as an instruction to display the next picture is issued. In the case of moving pictures, the output of image data is continued until the transmitting terminal is switched. Of course, the transmission of data is postponed if the amount of image data exceeds the capacity of the buffer in the image displaying device.

The image displaying system mentioned above will function if the image displaying device and terminals perform prescribed processing sequentially, as a matter of course. Therefore, the present invention is directed also to an image displaying method. The displaying system according to the present invention may exist alone or may be incorporated into any apparatus. The present invent embraces all of these embodiments, which may manifest themselves as software or hardware.

If the idea of the present invention is embodied in software for the image displaying system, there exists a program to realize its function, as a matter of course.

DESCRIPTION OF THE REFERRED EMBODIMENTS

The embodiment of the present invention will be described in the order shown below.

Figure 1:
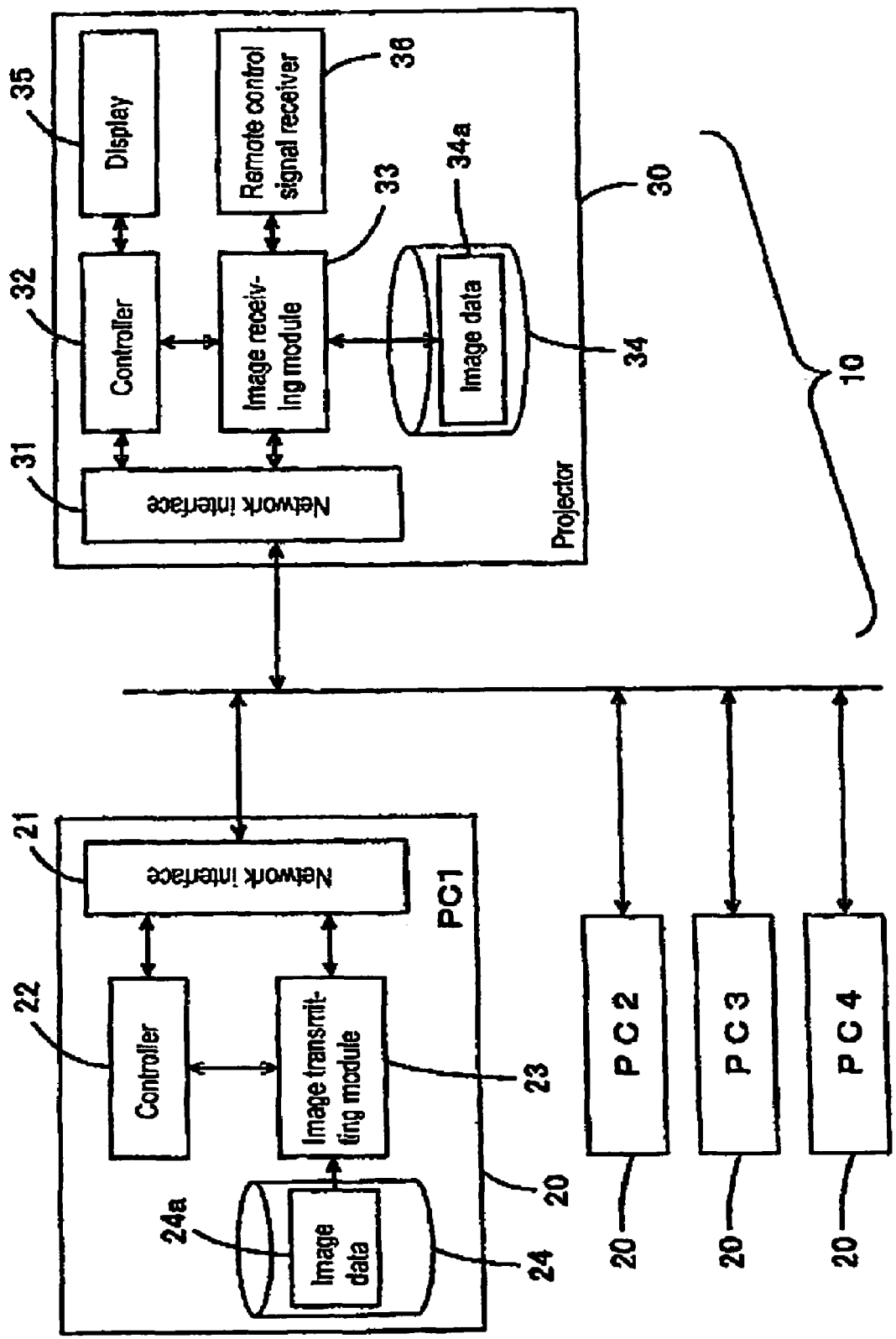
FIG. 1 is a diagram showing the construction of the image displaying system according to the present invention.

(1) Construction of the image displaying system
(2) Processing by the projector
(3) Processing by each terminal
(4) Action of the image displaying system
(5) Other embodiments
(1) Construction of the Image Displaying System FIG. 1 is a diagram showing the construction of the image displaying system. In this figure, there is shown the image displaying system 10, which consists of a plurality of computers PC 20 and the projector 30. The projector 30 acquires the image data which has been output from each computer PC 20 and then projects an image for display according to the thus acquired image data. In this embodiment, the computers PC 20 and the projector 30 communicate with each other through the UTP cable for LAN.

In addition, the computers PC 20 and the projector 30 communicate with each other by means of TCP protocol. The computers PC 20 and the projector 30 establish connection by exchanging packets with each other, so that each of image data is transmitted after division into packets, as occasion demands. In FIG. 1, a plurality of computers PC 20 are designated as computer PC1 to computer PC4, and the construction of the computer PC1 is shown by a block diagram.

Each of the computers PC2 to PC4 may have the same construction as shown in the block diagram.

The computer PC 20 may be any general-purpose computer capable of controlling the interface and recording media and executing programs under the control of a specific OS. The computer PC 20 as a constituent of the image displaying system according to the present invention is provided with a network interfac 21, a controller 22, an image transmitting module 23, and a hard disk drive (HDD) 24. The controller 22 controls the network interface 21 for communication with the projector 30. In other words, it interprets the command described in the packet received through the network interface 21, and it transmits and receives data.

In this embodiment, the controller 22 acquires the request to suspend transmission, the request to transmit image data for one screen, and the request to transmit image data continuously, which are sent from the projector 30. Then, the controller 22 controls the image transmitting module 23 and causes it to output image data properly. The HDD 24 is a storage medium capable of storing various data; it stores previously prepared image data 24a for images to be used for presentation. The image transmitting module 23 acquires the image data 24a and outputs it to the projector 30 in response to the instruction from the controller 22.

The projector 30 is also capable of controlling the interface and recording media and executing the prescribed program under control of a specific OS. The projector 30 as a constituent of the image displaying system according to the present invention is provided with a network interface 31, a controller 32, an image receiving module 33, an HDD 34, a display 35, and a remote control signal receiver 36. The controller 32 controls the network interface 31 for communications with the computer PC 20. In other words, it interprets the command described in the packet received through the, network interface 31, and it transmits and receives data.

In this embodiment, the controller 32 outputs the request to suspend transmission, the request to transmit image data for one screen, and the request to transmit image data continuously, which are sent to the computer PC 20. This construction permits the acquisition of necessary image data while keeping low the amount of data being transmitted over the network. In addition, the controller 32 controls the image receiving module 33, thereby causing it to acquire the image data for one screen or the image data which is continuously transmitted from each computer PC 20. The controller 32 also causes the HDD 34 to store the image data 34a.

The controller 32 controls the display 35, thereby causing it to display various images based on the image data 34a. In other words, the controller 32 determines the brightness of the color of each pixel based on the data concerning each pixel indicated by the image data 34a, thereby controlling the display 35. Responding to this control, the display 35 projects light onto an outside screen through the lens, thereby displaying an image. In addition, the controller 32 determines the brightness of the color of each pixel of the image on the screen in such a way that the image on the screen is divided into a plurality of sections and each section shows the image based on the image data sent from each computer PC 20. Of course, the controller 32 may also cause an image to be shown on the entire screen based on the image data sent from each computer PC 20.

Incidentally, in this embodiment of the present invention, the projector 30 has the remote control signal receiver 36, which receives signals transmitted from a remote controller (not shown), so that the controller 32 understand what is intended by the remote controller. The remote controller sends an instruction to switch the image, so that the controller 32 switches the image sequentially in response to the instruction for image switching. In other words, the controller 32 instructs the computer PC 20 (as the source of image data) to output image data after switching and then acquires image data, thereby causing the display 35 to display the relevant image. This construction permits the user to perform presentation while switching the images by remote control.

In addition, the remote controller permits one to issue an instruction for mode switching. The projector 30 according to this embodiment has the split display mode and the sequential display mode. The split display mode works in such a way that the controller 32 controls the display 35, thereby dividing one screen into a plurality of sections and causing each section to display an image based on the image data supplied from each computer PC 20. In this way the user can carry out presentation by showing the audience a plurality of images at one time.

In the sequential display mode, images based on the image data which has been output by a plurality of terminals are sequentially displayed on one screen, and the computers PC 20 (as the senders) can be sequentially switched by the remote controller mentioned above. When one of the computers PC 20 (as the senders) is switched, the controller 32 suspends communications with remaining computers PC 20 and acquires the image data only from the relevant computer PC 20 and causes the display to display an image. This arrangement permits one to carry out presentation by using image data transmitted from a plurality of computers PC 20 while causing them to transmit only necessary image data over the network and keeping the network load low.

(2) Processing by the Projector

Figure 2:
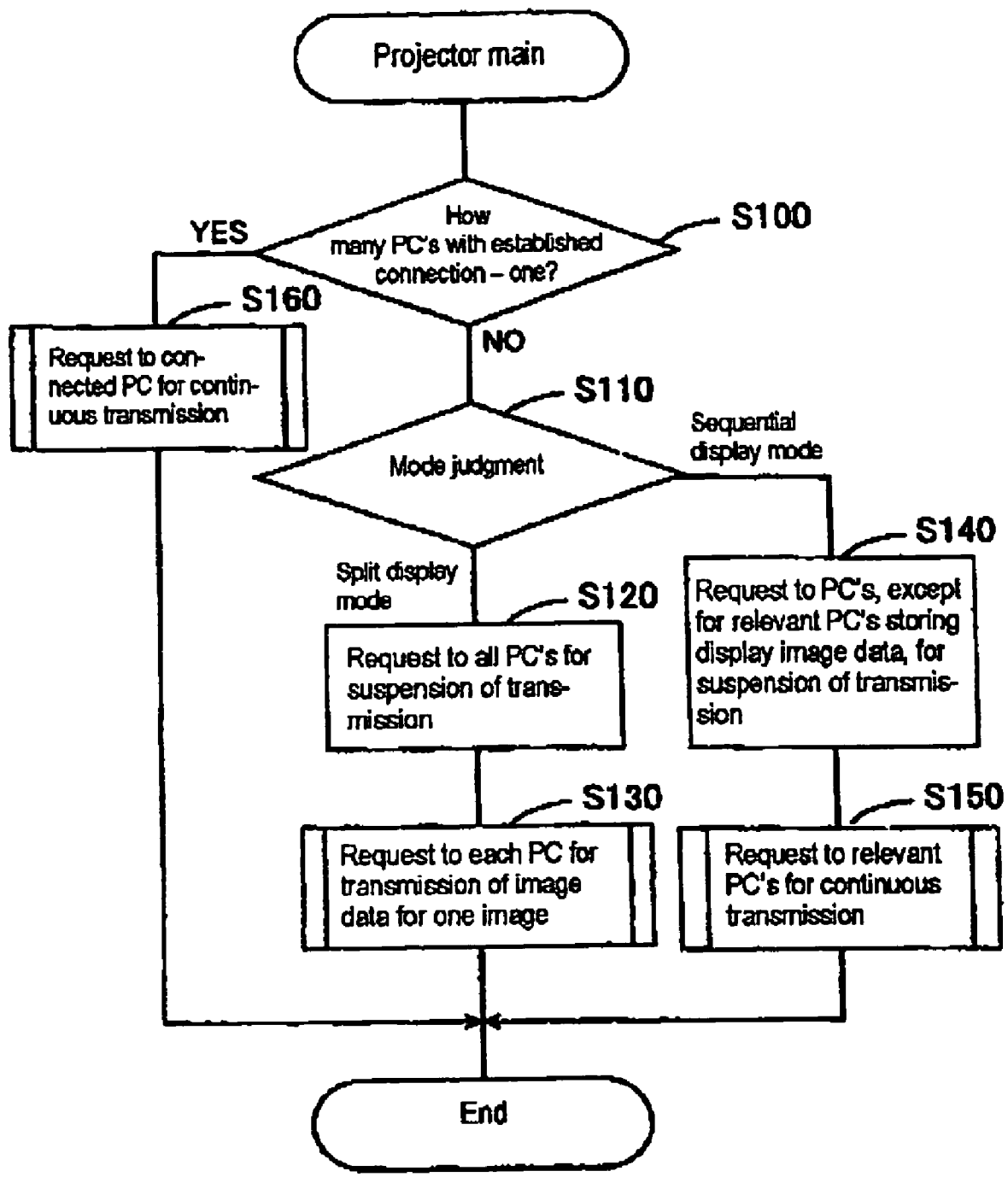
FIG. 2 is a flowchart for the process to be carried out in the projector.

What the controller 32 processes in the projector will be described in detail with reference to the flowchart shown in FIG. 2. According to this embodiment, it is necessary to set up the above-mentioned mode before starting image projection by the projector 30. It is also necessary to previously set up connection with each of the computers PC 20 connected to the network. In step S100, the controller 32 judges whether or not the number of computers PC 20 with connection established through the network is one. If the judgment in step S100 is affirmative, the controller 32 controls the image receiving module 33 and carries out communications only with one of the computers PC 20 which has established connection. Then, the controller 32 acquires image data only from the relevant computer PC 20 and causes the display 35 to display an image.

If the judgment in step S100 is not affirmative, the controller 32 judges the current mode in step S110. (This judgment indicates that a plurality of computers PC 20 are connected to the network and is capable of communication with the projector 30.) If the result of judgment in step S110 is that the previously established mode is the split display mode, then the controller 32 outputs a packet to all the computers PC 20 which have established connection, instructing to suspend transmission. This action prevents the image data from being output to the network from the computer PC 20.

In step S130, the controller 32 controls the image receiving module 33 and requests each of the computers PC 20 to transmit image data. In other words, the action in the split display mode is to cause each of the computers PC 20 to output the images to be displayed on each divided section of the screen. Thus, the controller 32 sends a request to the specific computer 20 for transmission and communicates with only the relevant computer PC 20 to acquire the image data for each divided section of the screen and suspend transmission. The controller 32 repeats this action as many times as the number of the divided sections of the screen. The result is that when the controller 32 acquires the image data for all the images to b displayed on the divided section, it prevents the computers PC 20 from transmitting data over the network simultaneously, so that it can acquire image data for the divided sections while keeping the network load low.

If the result of judgment in step S110 is that the previously established mode is the sequential mode, then the controller 32 requests (in step 140) all the computers PC, except for the relevant one storing the image data for the image to be displayed by the projector 30, to suspend transmission. In step S150, the controller 32 controls the image receiving module 33 and sends a request for transmission to the relevant computer PC 20 storing the image data for the image to be displayed by the projector 30, and it communicates only with the relevant computer PC 20

At this time, the image receiving module 33 may acquire the image data for one image and acquire additional image data each time it receives an instruction for image switching from the remote control signal receiver 36. Alternatively, It may acquire the image data which is continuously output for reproduction of moving pictures. In either cases, the system which is so constructed as to acquire the image data only from the relevant computer PC 20 prevents a plurality of computers PC 20 from transmitting data over the network at one time and hence acquires the image data while keeping the network load low.

(3) Processing by each Terminal

Figure 3:
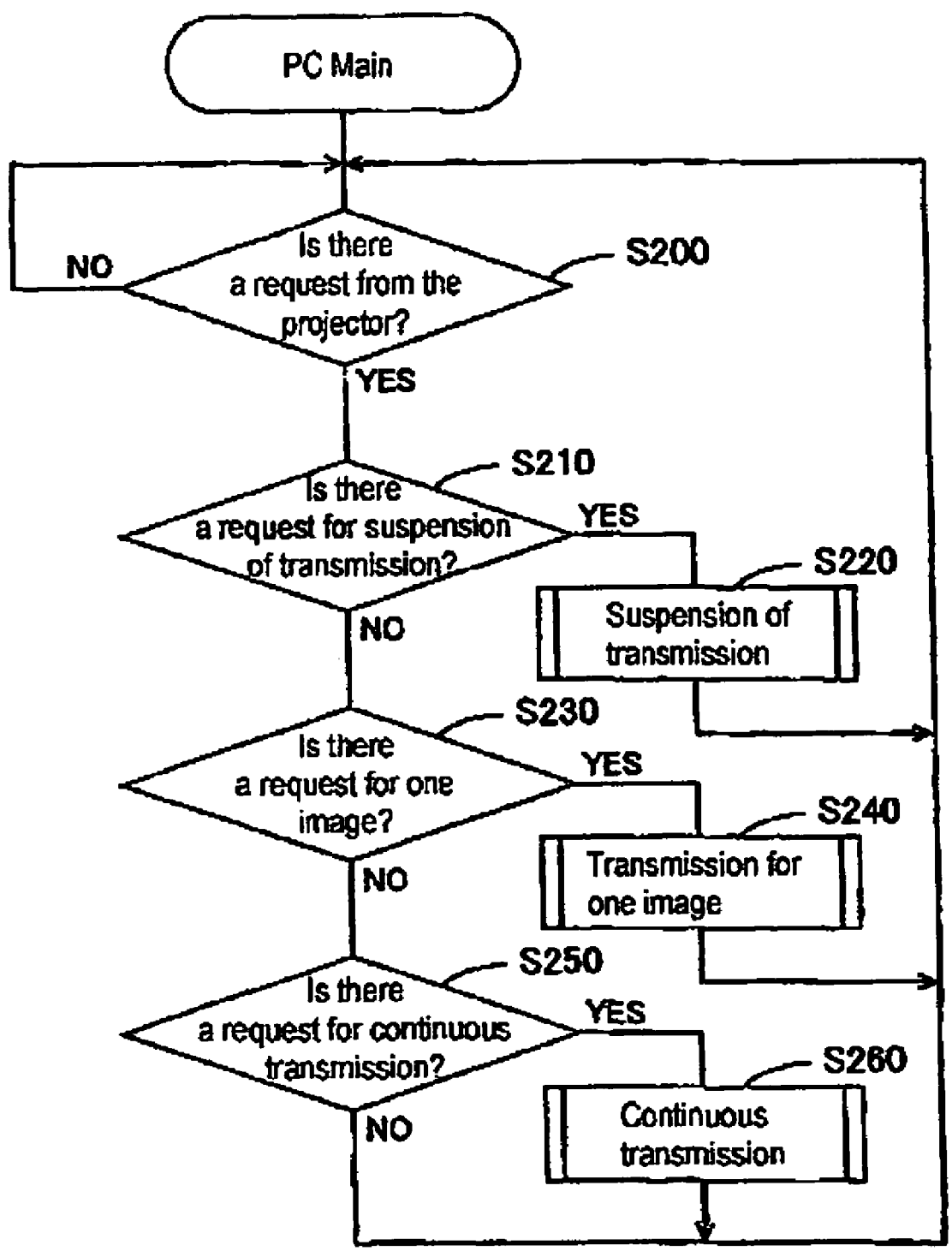
FIG. 3 is a flowchart for the process to be carried out in the computer PC.

What the controller 22 processes in each computer PC 20 will be described in detail with reference to the flowchart shown in FIG. 3. The controller 22 in each computer PC 20 previously establishes connection with the abovementioned projector 30 before the image data is output. And, each computer PC 20 carries out the process shown in FIG. 3 remaining in the state ready for outputting the image data for the image to be displayed by the projector 30. In step S200, the controller 22 monitors the network interface 21. In other words, it judges whether or not it has received a packet showing any request to itself from the projector 30.

If the controller 22 judges in step S200 that it has received a packet showing a certain request from the projector 30, then it judges in step S210 whether or not a request has been issued for suspension of transmission. If the controller 22 judges in step S210 that a request has been issued for suspension of transmission, then it controls the image transmitting module 23 in step S220 and suspends packet transmission. The computer PC suspends transmission temporarily even though it is a terminal to output the image data for an image to be displayed on one of the divided sections of the screen, and it waits for transmission while repeating the process in step S200.

If the controller 22 judges in step S210 that there is no request for suspension of transmission, then it judges in step S230 whether or not there is a request for transmission of image data for one image. If the controller 22 judges in step S230 that there is a request for transmission of image data for one image, then it controls the image transmitting module 23, thereby causing it to output image data for one image in step S240. If the controller judges in step S230 that there is no request for image data for one image, then it judges in step S250 whether or not there is a request for continuous transmission of image data.

If the controller 22 judges in step S250 that there is a request for continuous transmission of image data, then it controls the image transmitting module 23, thereby causing it to transmit image data continuously in step S260. According to this embodiment, the controller 22 previously judges in step S210 whether or not there is a request for suspension of transmission. Because of the above-mentioned processing, the computer PC 20 except for the one which has received a request for transmission, waits for transmission of image data until it receives a request for transmission. Therefore, the controller 22 causes only necessary data to be output over the network while keeping the network load low.

(4) Action of the Image Displaying System

Figure 4:
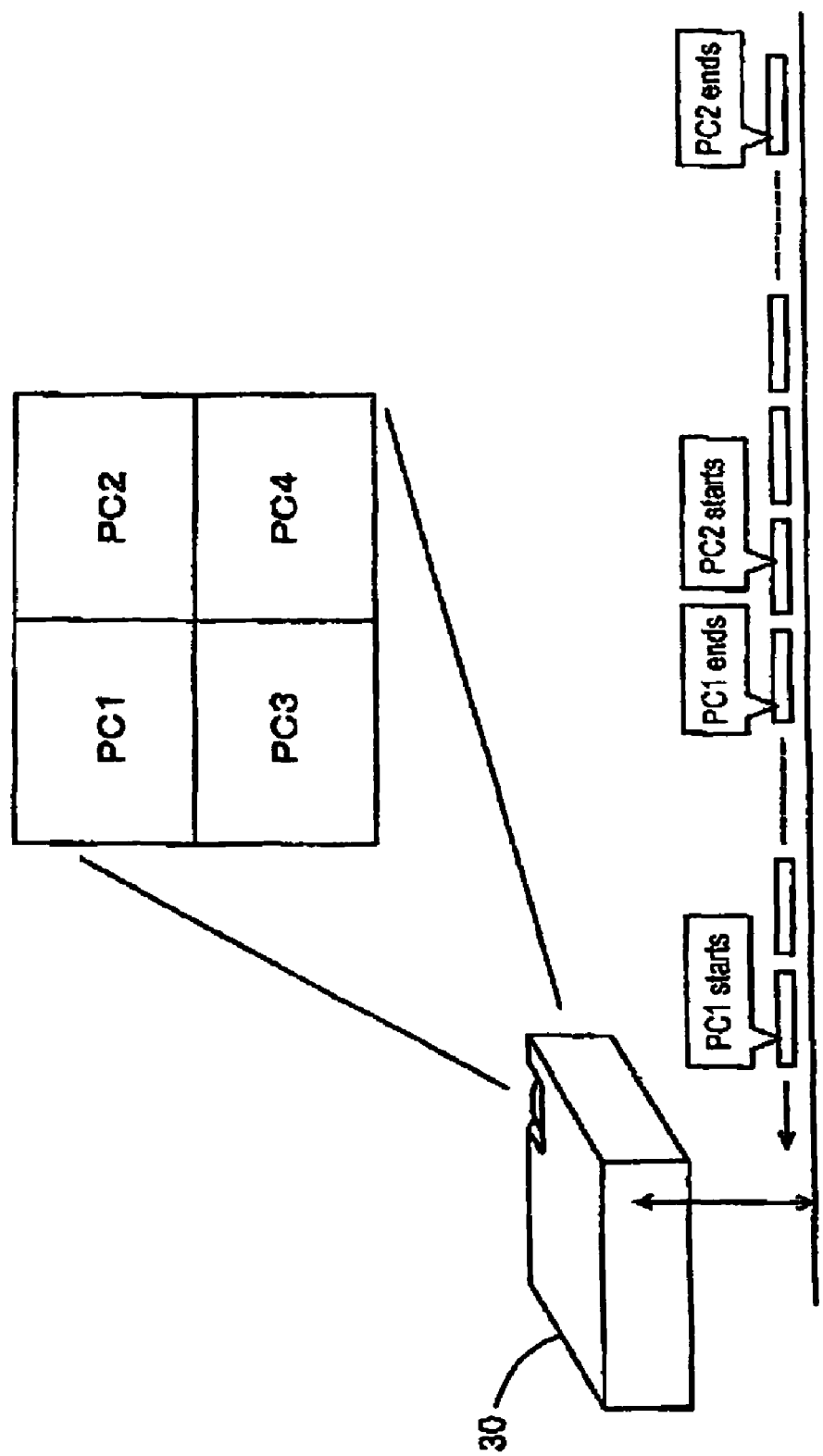
FIG. 4 is a diagram illustrating the action of the image displaying system.
Figure 5:
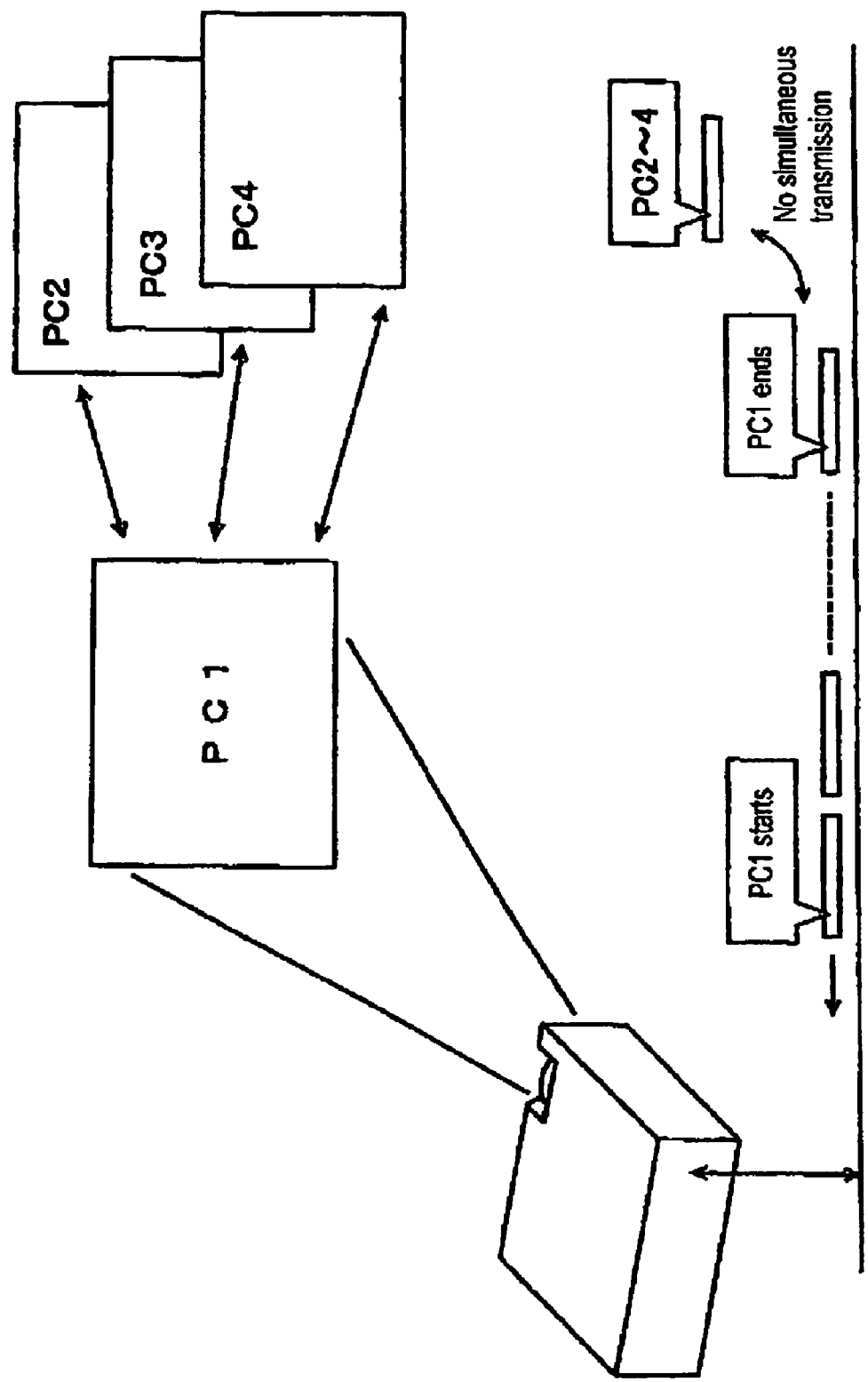
FIG. 5 is a diagram illustrating the action of the image displaying system.

The above-mentioned construction and processing realizes the image displaying system which functions as illustrated in FIG. 4. The embodiment shown in FIG. 5 is based on the split display mode. The screen is divided into four nearly identical sections, on which are displayed the images corresponding to the image data output from the computers PC1 to PC4 shown in FIG. 1. While images corresponding to the image data output from the computers PC1 to PC4 are being displayed on the divided sections, the user issues an instruction, by using a remote controller (not shown), to switch the images one after another in the following manner.

When such an instruction is issued, the projector 30 judges in step S110 that the system is running in the split display mode and it also requests all the computers PC to suspend transmission in step S120. The computers PC1 to FC4 judge in step S210 that there is a request for suspension of transmission, and it suspends transmission in step S220. In other words, there occurs a situation in which output data from the computers PC1 to PC4 is absent on the network temporarily. Moreover, in step S130, the projector 30 requests the computer PC1 to transmit image data for one image. In step S230, the computer PCd judges that there is a request for transmission of image data for one image, and it transmits the necessary image data in the form of a plurality of packets.

After the image data output from the computer PC1 has been transmitted, the projector 30 requests the computer PC2 to transmit image data for one image in step S130. In step S230, the computer PC2 judges that there is a request for transmission of image data for one image, and it transmits necessary image data for one image in the form of a plurality of packet. Each packet is schematically shown in FIG. 4. It is to be noted that there exists no situation in which two packets are output simultaneously, one representing the image data output from the computer PC1 and the other representing the image data output from the computer PC2. Thus, the packets are transmitted sequentially.

In general, if the computer PC1 and the computer PC2 output data simultaneously, the latter tries to output packets while the former is transmitting packets. When the packets from the computer PC1 are adequately received by the projector 30, the network load is reduced. In this situation, the packets from the computer PC2 are transmitted between the packets from the computer PC1. Then, the computer PC1 waits for transmission and tries to output packets. This processing usually permits a plurality of computers PC to transmit data simultaneously. However, data transmission in this manner results in an increased network load because of the necessity for establishing connection many times and inquiring whether data transmission is possible or not.

Particularly, in the case of transmitting image data of large volume transmission of image data is slow even though the receiver of image data (the projector 30 in this embodiment) has surplus resources, and hence the processing in the receiver of image data does not proceed smoothly in this embodiment, however, image data is transmitted sequentially from ach of the computers PC as shown in FIG. 4; this keeps the network load low and permits high-speed transmission of necessary data. Transmitting data in this manner is advantageous over transmitting data simultaneously from computer PC1 and computer PC2 in that time required from the start of transmission to the end of transmission is short for the same amount of data.

In the sequential display mode shown in FIG. 5, the user can switch, at any stage, by means of the abovementioned remote controller, the images based on the image data output from the computers PCd to PC4 shown in FIG. 1. In other words, as shown in FIG. 5, while the image based on the image data output from the computer PC1 is being displayed, the user can switch that image to another image based on the image data output from the computers PC2 to PC4. However, while the image based on the image data output from the computer PC1 is being displayed, other computers PC2 to PC4 are asked to suspend transmission: therefore, there is no possibility that the computers PC2 to PC4 and the computer PCd output image data simultaneously.

In other words, the projector 30 judges in step S110 that it is running in the sequential display mode, and it also requests in step S140 that the computers except for PC1 suspend transmission. The computers PC2 to PC4 judge in step S210 that there is a request to suspend transmission and suspends transmission in step S220. It also continues the processing that follows step S200 and waits until it receives a request for transmission. Moreover, in step S150, the projector 30 sends the computer PC1 a request for transmission of image data for one image or continuous transmission of image data. In step S230 or S250, the computer PC1 judges that there is a request for transmission, and it transmits the image data for one image or serial images in the form of a plurality of packets.

The above-mentioned processing performs control in such a way that while the image based on the image data output from the computer PC 1 is being displayed, the other computers PC2 to PC4 do not output image data. When the user issues, by means of the remote controller, an instruction to switch the source of image transmission, thereby causing the image of image data output from the computer PC 2 (for example) to be displayed, then the projector 30 instructs the computers (except for computer PC2) to suspend transmission in step S140 and performs the same processing as mentioned above. Thus, the projector 30 can display the image based on the image data output from the computer PC2. Also, the computers PC1, PC3, and PC4 do not output image data in compliance with the instruction to suspend transmission. Therefore, only the image data necessary for image display is output over the network; this reduces the network load at all times. Moreover, since the projector acquires the necessary image data sequentially, it does not need a large storage capacity.

(5) Other Embodiments

The above-mentioned embodiment is intended to realize the image displaying system, image displaying device, image data outputting device, image displaying method, image displaying program, and image data outputting program. Needless to say, the embodiment may be constructed in other manners than mentioned above. For example, the image displaying device is not restricted to the projector; instead, it may be a PDP, CRT, or LCD (liquid crystal display). The displaying device for presentation should preferably be one which has a large screen. However, the use of the present invention is not restricted to presentation. The present invention may be applied to a monitor system to display images taken by a plurality of cameras on a split screen, or a monitor system to sequentially display images taken by a plurality of cameras which are switched one after another at certain time intervals or according to the user's instruction.

Moreover, the split display mode does not necessarily require equally divided screens as shown in FIG. 4. Instead, the screen may be divided into a large main section and a plurality of small sections. In this case, the large main section displays an image for the main subject of presentation that attracts the attention of audience and the small sections display images (data) to supplement presentation. This arrangement will facilitate effective presentation. The content of display in the large and small sections may be switched over depending on situation.

Moreover, the embodiment of the present invention is not restricted in the form of network so long as the image displaying device and the terminals are connected with each other through a network. Connection may be by a LAN (as mentioned above) or the Internet. In this way, the user may perform presentation by using images offered by those who are away from one another. Both wire network and wireless network are acceptable.

In addition, the above-mentioned construction designed to select the split display mode and the sequential display mode is not essential. The projector will work in either of the two modes. The mode may be judged from the image structure being used or the number of computers PC associated with the images. (It is not always necessary to rely upon the previously established mode.) There are several methods for judging in step S100 the number of computers PC with established connection. It would be possible to count the number of the computers PC which have responded to broadcast communications. It would also be possible to count the number of the computers PC which has requested connection by memorizing that there has been a request for connection from the computer PC. The communication protocol is not restricted to TCP; it may be UDP or any other protocol.

What is claimed is:

1. An image displaying device which is connected with a plurality of terminals to store image data through a network that permits two-way communications and which acquires image data from each terminal, thereby displaying an image, said image displaying device comprising:

a communication unit at the displaying device side that performs two-way communications with each of said terminals, an image data acquisition controlling unit that acquires image data from a relevant terminal in such a way that when the image data acquisition controlling unit acquires image data from the relevant terminal by controlling said communication unit at the displaying device side, the image data acquisition controlling unit instructs other terminals to suspend transmission, thereby suspending transmission of image data, an image displaying unit that displays an image in response to the image data acquired as the result of control by said image data acquisition controlling unit, and a mode switching unit that switches a split display mode to and from a sequential display mode, so that, in the split display mode, the image displaying unit displays images based on individual image data on divided sections of one screen, and in the sequential display mode, the image displaying unit displays one image based on the individual image data on a full screen, wherein the image data acquisition controlling unit controls, in the sequential display mode, the communication unit at the display device side in such a way that the image data acquisition controlling unit designates a specific terminal as the relevant terminal until the transmission terminal is switched and continues to acquire image data, and the image data acquisition controlling unit sends to the terminals, other than the relevant terminal, a request to suspend transmission, requests the relevant terminal for transmission of image data for one image or continuous transmission of image data until an instruction to switch the source of image transmission is issued, so that while the image based on the image data output from the relevant terminal is being displayed, the other terminals do not output image data, and thereafter requests the switched terminal to transmit image data.

2. The image displaying device as defined in claim 1, in which the image data acquisition controlling unit controls, in the split display mode, the communication unit at the display device side in such a way that it designates sequentially each terminal which stores image data for images to be displayed on the divided sections as the relevant terminal and sequentially acquires image data for images to be displayed on the divided sections.

3. An image displaying method for causing each terminal of a plurality of terminals to output image data to an image displaying device to display an image, thereby displaying an image, said image displaying device being connected through a network capable of two-way communications with the plurality of terminals to store image data for images to be displayed, said image displaying method comprising:
  an instruction to suspend transmission of image data issued to other terminals when image data are acquired from a relevant terminal,
  the outputting of image data is suspended in the terminal to which an instruction to suspend transmission has been issued, the outputting of image data is continued in the relevant terminal to which no instruction to suspend transmission has been issued,
  the image displaying device acquires image data from the relevant terminal, thereby displaying images based on the acquired image data,
  switching a split display mode to and from a sequential display mode, so that, in the split display mode, the image displaying device displays images based on individual image data on divided sections of one screen, and in the sequential display mode, the image displaying device displays one image based on the individual image data on a full screen,
  designating, in the sequential display mode, a specific terminal as the relevant terminal until the transmission terminal is switched and continues to acquire image data, and
  instructing the relevant terminal to transmit image data for one image or continuously transmit image data until an instruction is issued to switch the source of the image transmission, thereby while the image based on the image data output from the relevant terminal is being displayed, the other terminals do not output image data, and thereafter requests the switched terminal to transmit image data.

4. A computer-readable medium storing an image displaying program to control an image displaying device which is connected through a network capable of two-way communications with a plurality of terminals to store image data and which acquires image data from each terminal, thereby displaying images, said image displaying program comprising:
  a communication function allowing a computer at the display device side to perform two-way communications with said terminals,
  an image data acquisition controlling function which, when acquiring image data from a relevant terminal by controlling said communication function at the display device side, instructs other terminals to suspend transmission, thereby suspending transmission of image data, and acquires image data from the relevant terminal,
  an image displaying function that causes the image display device to display images based on the image data acquired by control by the image data acquisition controlling function, and
  a mode switching function that switches a split display mode to and from a sequential display mode, so that, in the split display mode, the image displaying function displays images based on individual image data on divided sections of one screen, and in the sequential display mode, the image displaying function displays one image based on the individual image data on a full screen, wherein
  the image data acquisition controlling function controls, in the sequential display mode, the communication function at the display device side in such a way that the image data acquisition controlling function designates a specific terminal as the relevant terminal until the transmission terminal is switched and continues to acquire image data, and
  the image data acquisition controlling function sends to the terminals, other than the relevant terminal, a request to suspend transmission, requests the relevant terminal for transmission of image data for one image or continuous transmission of image data until an instruction to switch the source of image transmission is issued, so that while the image based on the image data output from the relevant terminal is being displayed, the other terminals do not output image data, and thereafter requests the switched terminal to transmit image data.

* * * * *